United States Patent
Krohmer et al.

(10) Patent No.: US 7,041,363 B2
(45) Date of Patent: May 9, 2006

(54) SOLID BODY WITH MICROSTRUCTURED SURFACE

(75) Inventors: Christoph Krohmer, Stockstadt (DE); Hans Lorenz, Darmstadt (DE); Norbert Brand, Darmstadt (DE)

(73) Assignee: Roehm GmbH & Co. KG, Darmstadt (DE)

( * ) Notice: Subject to any disclaimer, the term of this patent is extended or adjusted under 35 U.S.C. 154(b) by 93 days.

(21) Appl. No.: 10/477,194

(22) PCT Filed: Apr. 1, 2003

(86) PCT No.: PCT/EP03/03368

§ 371 (c)(1),
(2), (4) Date: Nov. 17, 2003

(87) PCT Pub. No.: WO03/087604

PCT Pub. Date: Oct. 23, 2003

(65) Prior Publication Data

US 2004/0155150 A1   Aug. 12, 2004

(30) Foreign Application Priority Data

Apr. 17, 2002   (DE) ................... 102 17 111

(51) Int. Cl.
*B32B 17/10* (2006.01)

(52) U.S. Cl. ............... 428/209; 244/200; 244/130
(58) Field of Classification Search ............... 428/209, 428/409; 244/130, 200; 264/162, 284, 293, 264/328.1, 400
See application file for complete search history.

(56) References Cited

U.S. PATENT DOCUMENTS 4,706,910 A   11/1987   Anders et al.

(Continued)

FOREIGN PATENT DOCUMENTS

DE   35 34 293   4/1987

(Continued)

OTHER PUBLICATIONS

Merriam Webster On Line website www.m-w.com Jun. 13, 2005.*

(Continued)

*Primary Examiner*—Deborah Jones
*Assistant Examiner*—Elizabeth D. Ivey
(74) *Attorney, Agent, or Firm*—Oblon, Spivak, McClelland, Maier & Neustadt, P.C.

(57) ABSTRACT

The invention relates to a solid body of plastic, glass, ceramic or metal which has at least partially a microstructured surface with rows oriented in a preferential direction of cross-sectionally trapezoidal or wedge-shaped ridges, wherein the ridges have minima and maxima in height (H) which lie in the range from 0 mm to 2 mm, and the minima and maxima follow one another periodically with amplitudes in the range from 0.005 to 20 mm, and the spacing of the rows of neighboring ridges in relation to one another is 0.002 mm to 5 mm, it being possible for the valleys between the rows to be planar, curved or tapered, and the cross-sectionally trapezoidal or wedge-shaped ridges have a wedge angle ($\alpha$) in the range from 15 to 75°.

16 Claims, 1 Drawing Sheet

U.S. PATENT DOCUMENTS

Figure 1A:
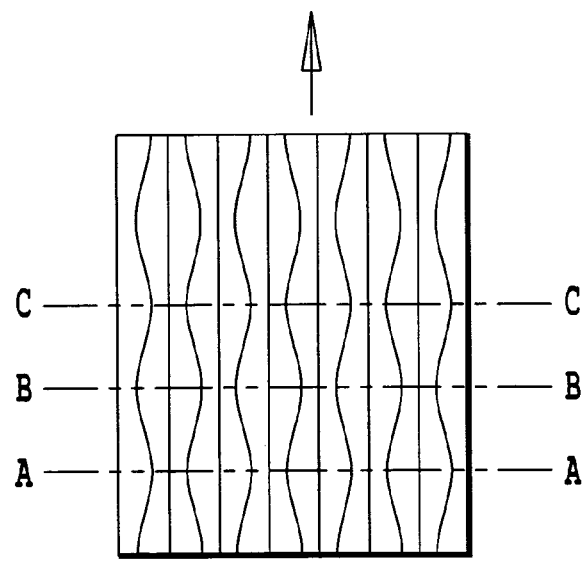
Figure 1B:
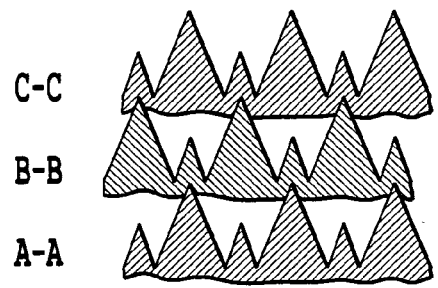

| | | | |
|---|---|---|---|
| 4,907,765 A | * | 3/1990 | Hirschel et al. ............ 244/130 |
| 4,930,729 A | | 6/1990 | Savill |
| 5,133,516 A | * | 7/1992 | Marentic et al. ............ 244/200 |
| 5,860,626 A | * | 1/1999 | Moser ........................ 244/200 |
| 5,971,326 A | * | 10/1999 | Bechert ...................... 244/200 |
| 6,193,191 B1 | * | 2/2001 | Falcimaigne et al. ....... 244/130 |
| 6,345,791 B1 | | 2/2002 | McClure |

FOREIGN PATENT DOCUMENTS

| | | |
|---|---|---|
| DE | 36 09 541 | 9/1987 |
| DE | 201 14 878 | 3/2002 |
| EP | 0 246 915 | 11/1987 |
| EP | 0 543 647 | 5/1993 |
| EP | 0 726 398 | 8/1996 |
| EP | 0 846 617 | 6/1998 |
| WO | 95 11388 | 4/1995 |

OTHER PUBLICATIONS

Hall T: "Rippenstrukturen Vermindern Aerodynamischen Widestand Sowie Rauschen Infolge Stroemungen" Messen und Prufen, Iva International, Munich, DE, Nr. 3, 1. Marz 1990 (Mar. 1, 1990), Seiten 116-117, XP000175645 ISSN: 0937-3446 das ganze Dokument.

* cited by examiner

SOLID BODY WITH MICROSTRUCTURED SURFACE

AREA OF THE INVENTION

The invention relates to a solid body of plastic, glass, ceramic or metal which has at least partially a microstructured surface with rows oriented in a preferential direction of cross-sectional trapezoidal or wedge-shaped ridges. The invention also relates to methods of producing the solid body and possible uses.

PRIOR ART

Solid bodies with microstructured surfaces produced by mechanical means are known per se and follow the friction-reducing physical principle known from nature, such as from the skin of a shark. They are consequently sometimes trivially also referred to as "sharkskin". With suitable structuring, a reduction in the frictional or flow resistance can be observed when a gas or liquid flows over in a turbulent state.

DE 36 09 541 A1 describes a flow resistance reduced by a surface having a reduced wall shearing stress of a body flowed over in a turbulent manner, with channels which run in the direction of flow and are separated from one another by ribs formed with sharp edges. In this case the ribs are not arranged parallel in continuous rows but respectively offset from one another.

EP 0 846 617 A2 describes a surface for a wall flowed over in a turbulent manner by a flow having a main direction of flow, with ribs which are aligned in the direction of flow and spaced laterally apart in relation to the main direction of flow, and the height of which is 45 to 60% of the rib spacing. The ribs are formed in a wedge-shaped manner with a wedge angle of 20 to 50°. The valleys between the rows may be planar or curved.

PROBLEM AND SOLUTION

The surfaces described in DE 36 09 541 A1 have the disadvantage that, on account of the alternating arrangement of the rib elements, they can be produced only with difficulty or great expenditure and at the same time their friction-reducing effect is only small.

The structures described in EP 0 846 617 A2 ensure that the surface is flowed over in a homogeneous manner with relatively low friction. However, the regular arrangement of the microstructure has the effect that a comparatively only thin boundary layer forms between the surface and the overflowing medium, fluid or gas, which is not optimal for the breaking up of the friction-inducing shearing stress. Therefore, the flow can easily be disturbed and possibly even break away.

On the basis of the prior art, the intention was to develop solid bodies with microstructured surfaces further to achieve a further reduction in the frictional or flow resistance.

The problem is solved by a solid body of plastic, glass, ceramic or metal which at least partially has a microstructure surface with rows oriented in a preferential direction of cross-secionally trapezoidal or wedge-shaped ridges, characterized in that the ridges have minima and maxima in height (H) which lie in the range from 0 mm to 2 mm, and the minima and maxima follow one another periodically with wavelengths in the range from 0.005 mm to 20 mm, and the spacing of the rows of neighboring ridges in relation to one another is 0.002 mm to 5 mm, it being possible for the valley between the rows to be planar, curved or tapered, and the cross-sectionally trapezoidal or wedge-shaped ridges have a wedge angle ($\alpha$) in the range from 15 to 75°.

The solid body according to the invention has in particular the advantage that, when flowed over with a gas or a fluid, it has a very low frictional or flow resistance. This is achieved in particular by a surface structure with rows of cross-sectionally trapezoidal or wedge-shaped ridges.

At the same time, the fact that the ridges have minima and maxima in height (H) which lie in the range from 0 mm to 2 mm, and the minima and maxima follow one another periodically with wavelengths in the range from 0.005 to 20 mm, achieves the effect that an intrinsically more or less inhomogeneous overflow which does not break away even over relatively long distances is achieved. According to the invention, this allows a better overall result to be accomplished in comparison with the prior art.

FIGURES

The invention is explained by the figures which follow but is not restricted to them.

FIG. 1b:

Cross-sectional planes A—A, B—B and C—C of FIG. 1a. The cross-sectional planes A—A, B—B and C—C show the alternating minima and maxima of the heights (H) of the ridges running in parallel rows, the tapering valleys and the fluctuating cross-sectional base width.

Figure 1C:
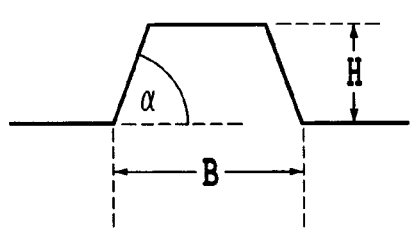
Figure 1D:
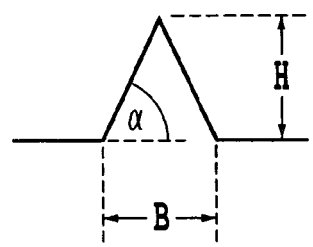

FIGS. 1c and 1d:

Ridges with symmetrical trapezoidal profile (left, FIG. 1c) and symmetrical wedge profile (right. FIG. 1d) with depicted height (H), cross-sectional base width (B) and wedge angle ($\alpha$) in cross section.

IMPLEMENTATION OF THE INVENTION

The invention relates to a solid body of plastic, glass, ceramic or metal which has at least partially a microstructured surface with rows oriented in a preferential direction of cross-sectionally trapezoidal or wedge-shaped ridges.

Materials

Preferred are plastics, in particular thermosetting plastics, and particularly preferred are thermoplastics. In the case of the thermoplastics, amorphous plastics are preferred.

Suitable plastic are, for example:

polymethyl methacrylate plastic, impact-modified polymethyl methacrylate, polycarbonate plastic, polystyrene plastic, styrene-acrylonitrile plastic, polyethylene terephthalate plastic, glycol-modified polyethylene terephthalate plastic, polyvinyl chloride plastic, transparent polyolefin plastic, acrylonitrile-butadiene-styrene (ABS) plastic or mixtures (blends) of different thermoplastics.

Preferred are weather-resistant plastics such as polymethacrylate plastic and/or impact-modified polymethacrylate plastic, polyvinylidene fluoride plastic and/or a mixture (blend) of polymethacrylate plastic and polyvinylidene fluoride plastic and/or of polycarbonate plastic.

Plastics with high levels of surface hardness are suitable in particular to counteract abrasive wear being caused by the superjacent overflow.

Liquid-crystal polymers are also suitable.

In the case of the metals, aluminum and titanium, and also alloys of these metals and possibly also magnesium alloys, may be mentioned.

Surface Structuring

The ridges have in height (H) minima which lie in the range from 0 mm to less than 2 mm. The minima preferably lie in the range 0.001 to 1 mm, in particular of in the range from 0.01 to 0.1 mm.

The ridges have in height (H) maxima which lie in the range from more than 0 mm to 2 mm. The maxima preferably lie in the range 0.001 to 1 mm, in particular of in the range from 0.01 to 0.1 mm.

The maxima are in this case always greater than minima. The maxima are preferably at least 0.001 mm, the minima.

The height of the ridges is determined in relation to the valleys. If the valleys lie in a reference plane, the heights of the ridges fluctuate in relation thereto. It is theoretically also possible for the ridges to lie in a reference plane and the valleys to fluctuate in depth, whereby fluctuating heights of the ridges are likewise brought about. Minima of 0 mm lie in the plane of the valleys. The minima are, however, preferably greater than 0 mm.

The minima and maxima follow one another periodically with wavelengths in the range from 0.005 to 20 mm, preferably from 0.05 to 5 mm. A sinusoidal wave profile is preferred.

The spacing of the rows of neighboring ridges in relation to one another is 0.002 mm to 5 mm, preferably 0.005 to 0.5 mm, in particular 0.02 to 0.2 mm, it being possible for the valleys between the rows to be planar, curved or tapered. The rows of ridges preferably run parallel to one another in the preferential direction.

The cross-sectionally trapezoidal or wedge-shaped ridges have a wedge angle ($\alpha$, see FIG. 1$c$)) in the range from 15 to 75 degrees, preferably 30 to 60 degrees, in particular 30 to 45 degrees. The trapezoidal or wedge-shaped cross sections are preferably symmetrical, but may possibly also be slightly or quite strongly asymmetrical. However, the latter is more problematical to realize in terms of flow technology and more difficult to realize in terms of production technology. In this case, the angle ($\alpha'$) opposite the angle ($\alpha$) is different from ($\alpha$), but should likewise lie in the range indicated for ($\alpha$). Provided that there are no major impairments in the function as a result, transitional forms and slight modifications from cross-sectionally trapezoidal or wedge-shaped ridges, and also mixtures of these classes of form, can also be used in one surface.

The ridges may additionally fluctuate periodically in the cross-sectional base width (B).

The ridges may run straight in their preferential direction or else run in such a way that they oscillate laterally about the preferential direction, preferably sinusoidally. In the case of a ridge side profile laterally oscillating about the preferential direction, the wavelengths of the lateral oscillations may be 0.005 to 20 mm, preferably 0.001 to 10 mm and in particular 0.01 to 1 mm.

The wedge angle ($\alpha$) of the ridges is preferably constant with respect to one row.

The periodic height fluctuations of the ridges of neighboring rows are preferably offset in relation to one another in an alternating manner, particularly preferably by half a wavelength, in particular by half a sinusoidal wavelength. This has the advantage that the occurrence of undesired resonant oscillations and/or acoustic oscillations is significantly reduced.

On the basis of the present invention, it is evident to a person skilled in the art that the surface structures explained here can still be modified in some way or other which has not been explicitly mentioned without significantly changing their function. Such modifications are to be regarded as included in the invention.

Methods of Production

The production of the solid bodies or corresponding shaped parts is possible by reproducing the microstructures by a primary-forming method, re-forming method, abrasive machining or depositing technique, for example by embossing methods, chip-removing machining, casting, injection-molding, high-energy radiation (for example laser beams), a photoetching technique, etc.

In the case of the plastics, appropriate methods are those in which a polymerizing mixture, for example a syrup of methyl methacrylate and polymethyl methacrylate, containing a polymerization initiator, is reproduced on a primary mold. This may be, for example, a glass plate with a negatively reproduced microstructure.

In the case of thermoplastics, for example, extruded sheets or films may be passed over embossing rollers, preferably metal rollers, on which there is a with negatively reproduced microstructure.

It may be advantageous to use a coextrusion method, in which the microstructure is impressed into an easily embossable layer, while a layer of plastic lying thereunder assumes essentially the function of a support. EP-A 659 531 discloses a corresponding coextrusion method for impressing macrostructures (Fresnel lenses), which however, after adaptation in a way which is a matter of routine for a person skilled in the art, is also suitable in principle for microstructures.

Uses

The solid bodies according to the invention can be used as components with friction-reducing surfaces for reducing friction of air or water flows on surfaces of (air, water or land) craft or as lines and tanks for reducing friction of fluid flows in the case of rapidly flowing fluids in lines and tanks, for reducing adherence of contaminants on surfaces worthy of protection, as antimicrobial surfaces, as light-refracting and/or diffusely light-scattering surfaces, as surfaces provided with an antireflective coating.

Apart from the advantageous flow properties, optical, haptic, adhesive and/or thermodynamic effects can also be technically accomplished and which are preferably required for semifinished or finished plastic parts on their surface.

Advantageous Effects

The invention lies in the improvement of the described geometry with the requirement that there is a further reduction in the friction of flowing fluids or gases, in particular air, on the surface structured according to the invention, brought about by a preferably sinuisoidal height profile and/or a sinusoidal side profile of the channel or ridge structure. This produces tiny local vortices, which remain largely stationary and form with respect to the fluid flowing past an improved boundary layer in which friction-inducing shearing stresses can be broken down better and, as a result, the retarding frictional effect of the fluid or gas onto the surface is reduced.

On account of the comparatively greater irregularity of the structure in comparison with the known geometries, the occurrence of harmful resonant oscillations is similarly reduced significantly. If there is contamination, the local elevations (maxima of the sinusoidal ridges) offer points of engagement for abrasion or resistance to complete wetting of the surface, whereby a coherent structure of the layer of contamination is destroyed and it disintegrates into islands of contamination, which for their part can easily be washed away on account of the steep ridge flanks. As a result, a self-cleaning effect is accomplished.

If the surface is provided with biocidally acting agents, which are for example applied as a coating, coextruded or introduced into the basic composition, the enlargement of the surface area has the overall effect of assisting the action of the agents and improving it in comparison with a uniform structure.

Optical properties: the structure according to the invention reduces light reflections at the surface. Moreover, decorative color and light effects in particular are produced by light refraction and re-emergence of radiation from the surface, which may be produced from a transparent to translucent and clear or colored plastic. The structured surface offers holding with particularly good grip, since the elevations of the ridges can be locally pressed deeper into skin, textile fabric, leather, etc. than planar structures without locally projecting elevations.

The structure according to the invention may be produced in a primary-forming or re-forming manner or be machined in a chip-removing manner or with high-energy radiation from a largely planar surface from amorphous, partially crystalline, crosslinked and uncrosslinked plastics, from metals and low-melting glasses.

The invention claimed is:

1. A solid body of plastic, glass, ceramic or metal, comprising:
    at least partially a microstructured surface with rows oriented in a preferential direction of cross-sectionally trapezoidal or wedge-shaped ridges,
    wherein said ridges have minima and maxima in height in a range of from 0 mm to 2 mm;
    wherein the minima and maxima follow one another periodically with wavelengths in a range from 0.005 to 20 mm;
    wherein spacing of rows of neighboring ridges in relation to one another is 0.002 mm to 5 mm;
    wherein valleys between the rows are planar or tapered; and
    wherein the cross-sectionally trapezoidal or wedge-shaped ridges have a wedge angle in a range of from 15 to 75°;
    wherein periodic height fluctuations of the ridges of neighboring rows are offset in relation to one another in an alternating manner.

2. The solid body as claimed in claim 1, wherein the ridges fluctuate periodically in a cross-sectional base width.

3. The solid body as claimed in claim 1, wherein the wedge angle of the ridges is constant with respect to one row.

4. The solid body as claimed in claim 1, wherein the ridges have a profile laterally oscillating about the preferential direction with wavelengths of the lateral oscillations of from 0.005 to 20 mm.

5. The solid body as claimed in claim 1, wherein the height fluctuations of the ridges of neighboring rows are offset in relation to one another in an alternating manner in each case by half a wavelength.

6. A method of producing a solid body as claimed in claim 1, comprising:
    reproducing the microstructures by a primary-forming method, re-forming method, abrasive machining or depositing method.

7. A component, comprising:
    the solid body as claimed in claim 1 comprising a friction-reducing surface for reducing friction of air or water flows on surfaces of air craft, water craft or land craft.

8. A line or tank, comprising:
    the solid body as claimed in claim 1 comprising a friction-reducing surface for reducing friction of a fluid flow in a case of a rapidly flowing fluid in said line or tank.

9. A component, comprising:
    the solid body as claimed in claim 1 comprising a friction-reducing surface for reducing adherence of a contaminant, on a surface to be protected.

10. A component, comprising:
    the solid body as claimed in claim 1 comprising an antimicrobial surface.

11. A component, comprising:
    the solid body as claimed in claim 1 comprising a light-refracting and/or diffusely light-scattering surface.

12. A component, comprising:
    the solid body as claimed in claim 1 comprising a surfaces provided with an antireflective coating.

13. The solid body as claimed in claim 1, comprising: cross-sectionally trapezoidal ridges.

14. The solid body as claimed in claim 1, comprising: cross-sectionally wedge-shaped ridges.

15. The solid body as claimed in claim 1, wherein the valleys between rows are planar.

16. The solid body as claimed in claim 1, wherein the valleys between rows are tapered.

* * * * *